United States Patent [19]
Curran

[11] 3,820,807
[45] June 28, 1974

[54] CART

[76] Inventor: Thomas W. Curran, 3006 Crest Dr., Bakersfield, Calif. 93306

[22] Filed: Jan. 17, 1973

[21] Appl. No.: 324,431

[52] U.S. Cl. .............................................. 280/47.3
[51] Int. Cl. ................................................ B62b 1/10
[58] Field of Search................. 280/47.3, 47.26, 78; 296/20

[56] References Cited
UNITED STATES PATENTS

| | | | |
|---|---|---|---|
| 704,426 | 7/1902 | Allen | 280/47.3 X |
| 1,384,630 | 7/1921 | Owens | 296/20 |
| 2,416,492 | 2/1947 | Neeley | 280/47.3 |
| 2,546,604 | 3/1951 | Lafky | 280/78 UX |
| 2,979,338 | 4/1961 | Dwyer | 280/47.3 |
| 3,236,537 | 2/1966 | Eckman | 280/47.3 X |
| 3,456,959 | 7/1969 | Hemphill et al. | 280/47.3 |

Primary Examiner—David Schonberg
Assistant Examiner—John A. Pekar
Attorney, Agent, or Firm—Huebner & Worrel

[57] ABSTRACT

A cart for the transport of a work load over rough terrain, the cart having a frame with downwardly convengent congruent sides providing adjacent lower ends; cross bars interconnecting the sides so as to form downwardly convergent opposite ends for the cart; a ground engaging wheel mounted for rotation between the lower ends of the sides; and handles oppositely extended from the ends for the exertion of directional control and balance of the cart.

5 Claims, 6 Drawing Figures

PATENTED JUN 28 1974 3,820,807

CART

BACKGROUND OF THE INVENTION

The present invention relates to a cart and more particularly to such a cart which is intended for use in hiking, camping and the like to facilitate the transportation of heavy and unwieldy work loads on narrow trails and over rough terrain where footing may be difficult and the grade precipitous and to provide a degree of maneuverability, balance and ease of use heretofore unattainable.

The prior art patents such as the Neeley U.S. Pat. No. 2,416,492; the Giovannoni U.S. Pat. No. 2,636,748; the Goodale U.S. Pat. No. 2,918,296; the Dwyer U.S. Pat. No. 2,979,338; the Tidwell et al. U.S. Pat. No. 2,992,834; and the Fay U.S. Pat. No. 3,482,850 relate primarily to carts for carrying supplies. The devices of these patents typify prior art carts over which the present invention constitutes an improvement.

The popularity of hiking and camping and the availability of a multitude of items for enhancing the comfort of trips into the mountains and other such recreational areas emphasize the problems of the transport of supplies into remote areas over narrow trails and rough terrain. The common practice is to carry all such supplies supported in back packs or, where available, to carry the supplies on pack animals trained for use in rugged areas. Back packs have been improved to the extent that they can be used to support larger loads. However, the weight of the supplies is directly supported by the hiker which is burdensome and constitutes a direct restriction on the distances which can be traveled in a given period of time. Pack animals on the other hand can be used to transport supplies of relatively great weight over relatively rough terrain. However, they must be fed and otherwise cared for and are expensive to rent or maintain for such purposes.

Conventionally available carts for such purposes have found only limited use due to their own inherent deficiencies. Carts which are capable of carrying a work load of a sufficient volume and weight to make their use of value are cumbersome in rough terrain and narrow trails. In very rough terrain, such carts are more of a hinderance than an aid to travel. Conversely other conventionally available carts which are relatively easy to maneuver over rough terrain are not adapted to carry sufficient weight to make their use of great assistance. Furthermore, these conventional carts are not normally collapsible so as to facilitate transport by a vehicle in order to get to the sight at which the journey is to begin.

Therefore, it has long been recognized that it would be desirable to have a cart which maximizes the volume and weight of supplies capable of being carried as well as the degree of maneuverability, balance and ease of use available when transporting such a load and which can be readily disassembled for storage when not in use.

SUMMARY OF THE INVENTION

In view of the foregoing, it is an object of the present invention to provide an improved cart for the transportation of supplies over narrow trails, rough terrain and into areas of limited access.

Another object is to provide such a cart which is adapted to transport the maximum volume and weight of supplies for its size.

Another object is to provide such a cart which maximizes the amount of maneuverability, balance and ease of use in the transportation of a work load.

Another object is to provide such a cart which provides an easily operable brake mechanism to minimize the danger of the cart going out of control.

Another object is to provide such a cart which can be readily disassembled to permit storage in confined areas.

Another object is to provide such a cart which is of extremely rigid, durable construction so as to insure a long operational life.

Another object is to provide such a cart which is adapted for motivation by two operators to maximize maneuverability, balance and control.

A further object is to provide such a cart which is adapted to support the entire weight of the work load received therein with an operator required only to balance and maneuver the cart.

A still further object is to provide such a cart which is of relatively simple, uncomplicated construction so as to insure dependable operation and a relatively low purchase price.

Further objects and advantages are to provide improved elements and arrangements thereof in a device for the purposes described which is dependable, economical, durable and fully effective in accomplishing its intended purposes.

DESCRIPTION OF THE PREFERRED EMBODIMENT

Figure 1:
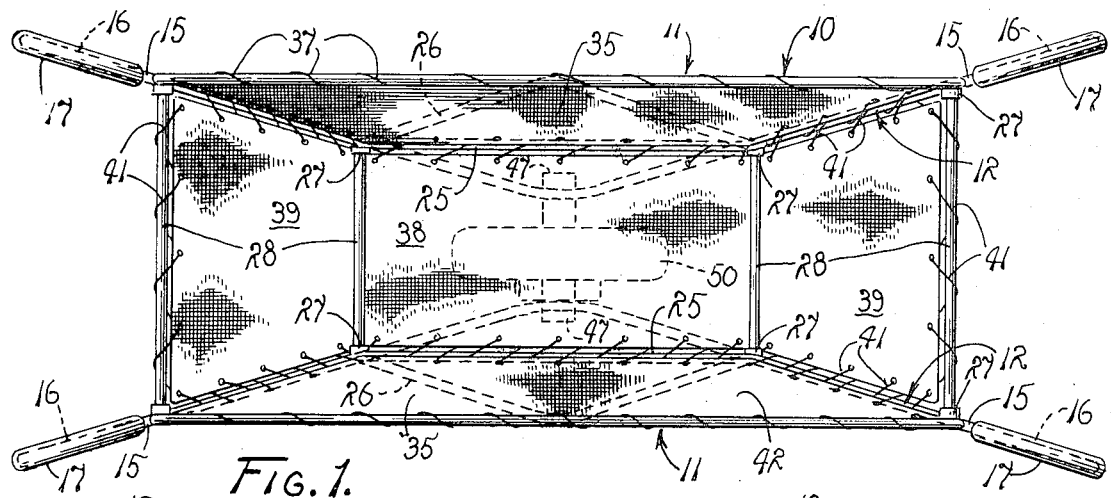
FIG. 1 is a top plan view of the cart of the present invention.

Referring more particularly to the drawings, the cart of the present invention consists of a tubular frame generally indicated at 10 in FIG. 1. The frame has opposite, downwardly convergent, substantially triangular, congruent, side portions 11. Each side portion has a return bent frame member 12 having a lower bent portion 13 and divergent upper portions 14. Each divergent upper portion has a remote end 15 from which is co-extensively extended an arcuate handle portion 16. A grip 17 is preferably received about each handle portion.

A pair of cross bars 25 is weldably secured in substantially parallel relation between the divergent upper portions 14 of each side portion 11 of the frame 10. One of the cross bars interconnects the remote ends 15 of each return bent frame member 12 the other being downwardly spaced therefrom interconnecting the upper portions midway between the remote ends and the bent portion 13 thereof. An angled brace 26 is mounted, as by welding, so as to interconnect the cross bars 25 of each side portion of the frame extending from the points of connection of the lower cross bar to a point intermediate the upper cross bar. An internally threaded coupling 27 is affixed on the divergent upper portions of the return bent frame member, as by welding, at its point of juncture with each cross bar, the couplings facing inwardly of the cart. The internal threads of threaded couplings of one frame member are wound oppositely to those of the couplings of the other frame member for purposes subsequently to be made more clearly apparent. A pair of substantially parallel connecting rods 28, each having opposite externally threaded ends 29, is detachably secured in interconnecting relation between the corresponding divergent upper portions 14 of the side portions 11 of the frame with their opposite ends screw threadably received in the corresponding internally threaded couplings 27 of the frame members. The connecting rods interconnecting corresponding upper portions of the frame members define end portions 30 for the frame 10.

Figure 2:
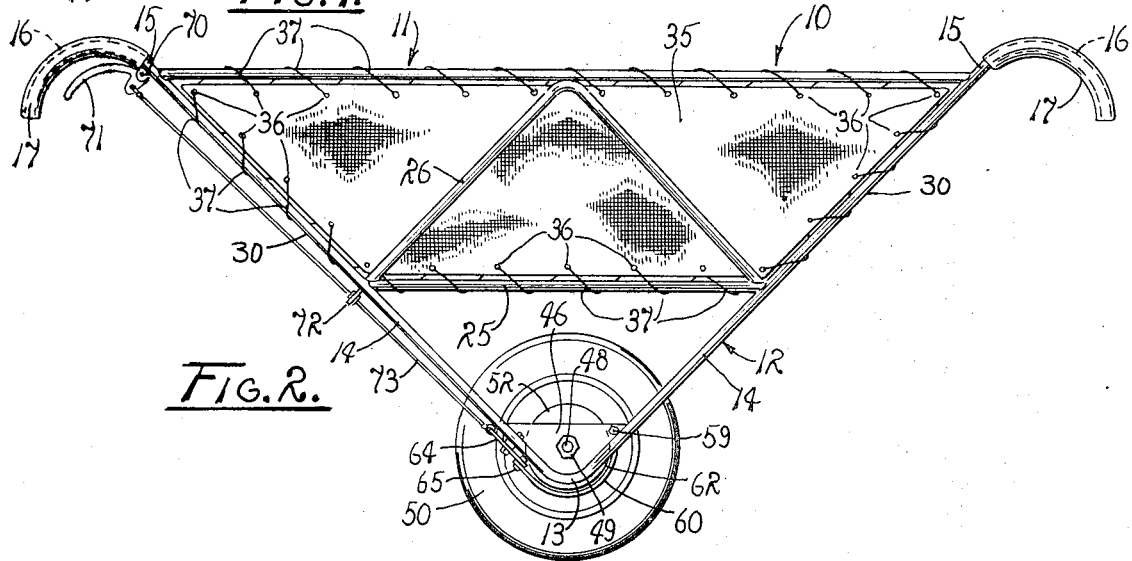
FIG. 2 is a side elevation of the cart.
Figure 5:
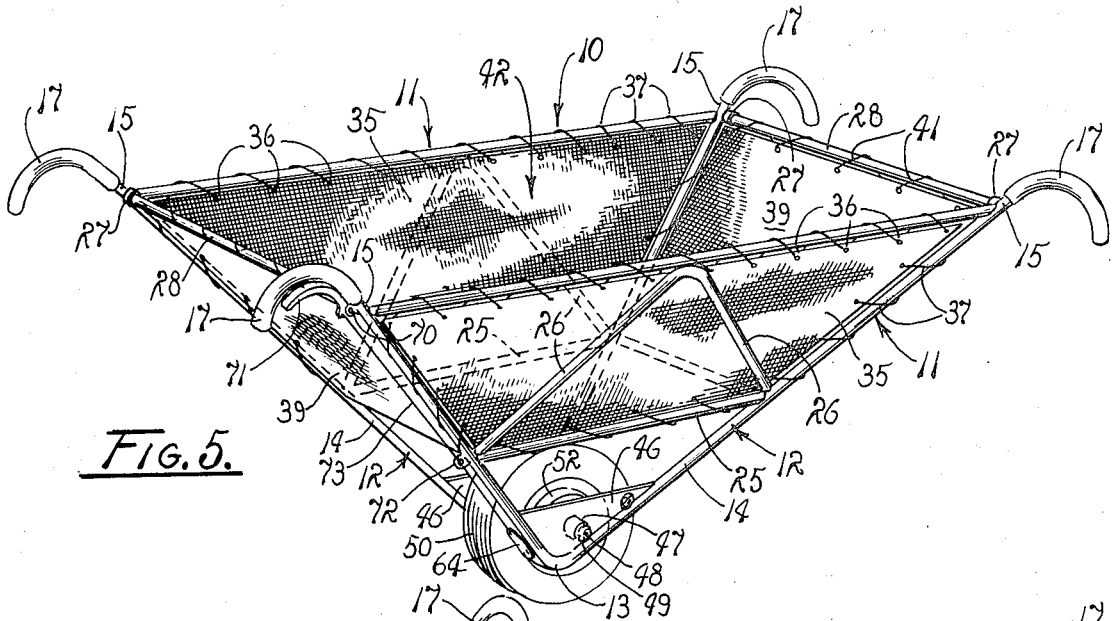
FIG. 5 is a perspective view of the cart.
Figure 6:
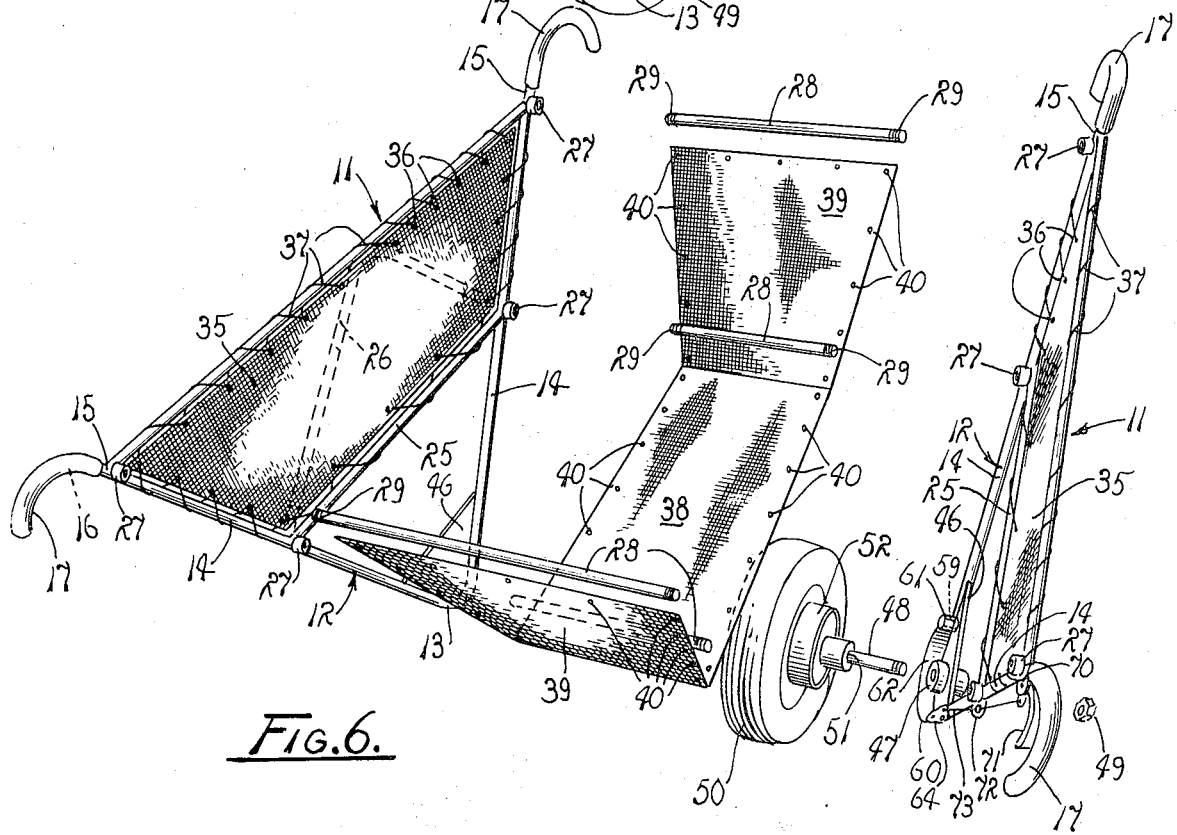
FIG. 6 is an exploded view of the cart.

Each of the side portions 11 of the tubular frame 10 mounts a side panel 35 preferably constructed of plastic or fabric material, extending between the cross bars 25 and the segments of the upper portions 14. Each side panel has a plurality of eyelets 36 extending therethrough and disposed in rows extending about the side panel adjacent to the periphery thereof. Each panel is secured in position by a cord 37 extending through each of the eyelets and tightened about the adjacent cross bar or divergent upper portion of each side portion so as securely to hold the panel in position, as best shown in FIG. 2. A substantially rectangular bottom panel 38 having end panels 39 co-extensively provided at the opposite ends thereof, is affixed on the tubular frame with the bottom panel extending between the lowermost connecting rods 28 and the end panels extending upwardly so as individually to interconnect each pair of adjacent connecting rods. The bottom panel and end panels have a plurality of eyelets 40 extending therethrough and disposed in rows extending about the bottom panel and end panels adjacent to the peripheries thereof, as best shown in FIG. 6. A cord 41 is extended through each of the eyelets and wound about the lowermost cross bars 25, divergent upper portions 14 and connecting rods 28 so as to retain the bottom panel and end panels in the position shown in FIG. 5. The side panels 35, bottom panel 38 and end panels 39 define a receptacle 42 in the frame of an inverted truncated pyramidal configuration.

The lower or bent portion 13 of each side portion 11 of the frame 10 mounts a plate 46 extending between the divergent upper portions 14, as best shown in FIG. 2. Axially aligned sleeves 47 are mounted in each plate in substantially parallel relation to the connecting rods 28. An axle bolt 48 is extended through the sleeves between the plates of the side portions and has nuts 49 releasably mounted on opposite ends thereof securely to retain the axle bolt in position. A conventional ground engaging wheel 50 is mounted for rotational movement on the axle bolt between the plates. The wheel has a central bearing 51 extended therethrough through which the axle bolt is received. A brake drum 52 is mounted on the wheel extending laterally thereof concentric to and about the bearing passage, as best shown in FIGS. 3 and 4.

Figures 3, 4:
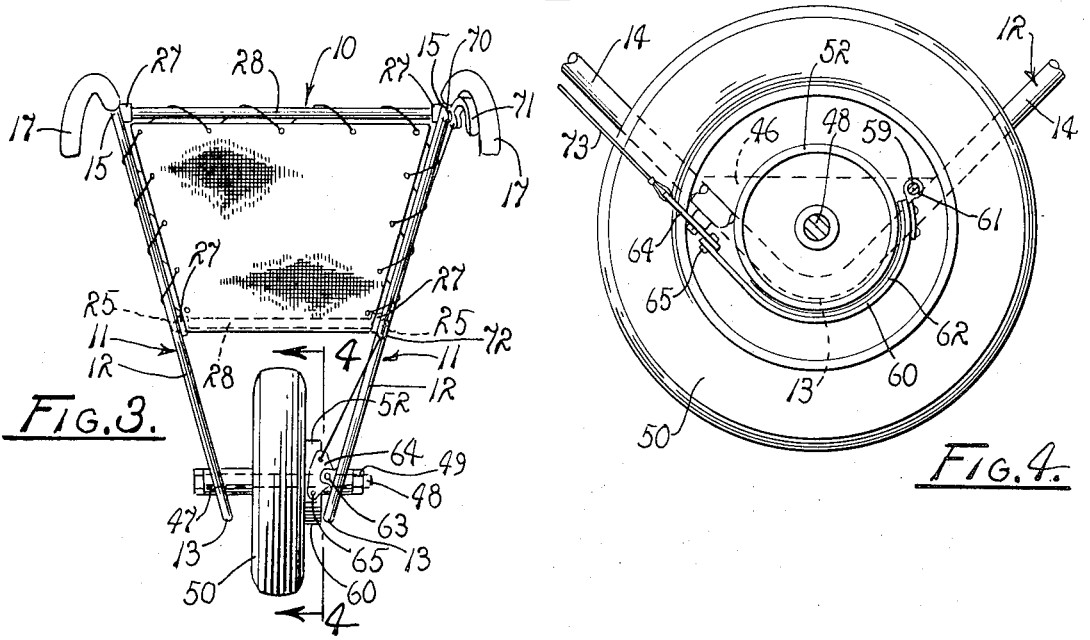
FIG. 3 is a rear elevation of the cart.
FIG. 4 is a somewhat enlarged side elevation of the cart taken on line 4—4 in FIG. 3.

A spindle 59 is affixed on the plate 46 most closely adjacent to the brake drum 52 and extends inwardly therefrom parallel to the axle bolt 48 to a point outwardly adjacent to the brake drum, as best shown in FIG. 4. An arcuate brake shoe 60, having a sleeve 61 fastened at one end thereof, is mounted for pivotal movement on the spindle with the sleeve 61 rotationally received thereon. The brake shoe has a brake pad 62 on the inner surface thereof adapted selectively to contact the brake drum. A flange 63 is affixed on the divergent upper portion 14 of the same side portion 11 of the frame 10 extending inwardly therefrom on the opposite side of the brake drum from the spindle 59. A pivot plate 64 is borne by the flange for pivotal movement adjacent to the brake drum and is connected at one of its ends to the end of the brake shoe remote from the sleeve 61 by pivotal connection 65.

A bracket 70 is mounted on the remote end 15 of the divergent upper portion 14 of the frame member 12 mounting the brake shoe 60 at the lower end 13 thereof. A lever or brake handle 71 is pivotally fastened on the bracket and extends below the adjacent arcuate handle 16 for the convenient operation thereof, as best shown in FIG. 2. A guide 72 is affixed on the same divergent upper portion midway between the brake handle 71 and the pivot plate 64. A brake cable 73 interconnects the brake handle and the end of the pivot plate 64 remote from the pivotal connection 65, extending through the guide, as best shown in FIGS. 3 and 4. Thus, upward movement of the brake handle 71 toward the arcuate handle 16 causes the brake pad 62 of the brake shoe to be brought into controlled contact with the brake drum 52 through the interaction of the brake cable and the pivot plate.

OPERATION

The operation of the described embodiment of the subject invention is believed to be clearly apparent and is briefly summarized at this point. In use the receptacle 42 of the tubular frame 10 is filled with the work load or supplies desired to be transported. The receptacle, being of an inverted truncated pyramidal configuration, is adapted to receive a great volume of items without the necessity of lashing the items down in order to retain them in position on the cart. However, supplies can be stacked in the receptacle above the upper cross bars 25 and connecting rods 28 so that it may be desirable to lash the items in position by securing ropes or cords to the upper cross bars and rods for this purpose.

Subsequently, one or more operators grasp the arcuate handles 16 at the end portions 30 of the frame 10. It should be noted that the cart is preferably oriented so that the end portion having the brake handle 71 is extended in the opposite direction from the intended direction of travel. Thus, the operator grasping the handles adjacent to the brake handle walks with the cart in front of him so as to push the cart and the operator grasping the other handles walks with the cart drawn behind him so as to pull the cart. The operators simply balance the cart during such travel on the wheel 50 and guide it over the rough terrain, as necessary. The brake handle 71 is operated to bring the brake pad 62 into contact with the brake drum 52 so as to slow or terminate rotation of the wheel 50 on the axle bolt 48. Thus, the cart is prevented from going out of control and the directional control thereof is facilitated.

Since the side portions 11 and the end portions 30 slope downwardly toward the wheel, the center of gravity of the cart is easily maintained directly vertically above the wheel for ease of balance. Furthermore, the extension of the handles 16 above the receptacle insures that the center of gravity, while being directly above the wheel, is also below the handles so as to facilitate directional control. Since the side portions 11 and end portions 30 are of substantially triangular construction, the cart has a maximum of structural rigidity combined with a minimum of frame weight. Thus the load potential is many times that of the weight of the cart.

When it is desired to disassemble the cart for storage such as for transport in the trunk of a car, the nut 49 is removed from the axle bolt 48. The axle bolt is then removed from receipt within the sleeves 47 permitting removal of the wheel 50 from the frame 10. Subsequently, the cord 41 is removed from the eyelets 40 of the bottom panel 38 and end panels 39 to allow those panels to be removed from the frame 10. Since, as previously described, the couplings 27 of one side portion 11 have internal threads which are wound in an opposite direction to those of the couplings of the other side portion, the connecting rods 28 are simply rotated so as threadably to remove the opposite threaded ends 29 thereof from the couplings allowing the side portions 11 to be separated for storage. The side portions can thereafter be stacked in facing engagement with the other elements thereof including the wheel, axle bolt, connecting rods and bottom and end panels rested thereon for most compact storage.

It should be noted that the cart can also be used as a supporting structure for a table or tent when not in use for purposes of transportation of a work load. This is accomplished by lashing each of the arcuate handles 16 by lengths of rope or cable, not shown, to the ground surface so as to secure the cart in a balanced upright configuration supported on the wheel 50. Where a table is desired, a suitable rigid plank or panel can be rested on the upper cross bars 25 extending over the receptacle 42 and laterally on opposite sides of the cart. Where a tent is desired, a tent frame member can be secured using ropes, not shown, in an upright position on the cart with the tent fabric draped thereover and fastened to the ground. In this particular configuration the cart adds structural rigidity to the construction of the tent and since the side portions 11 of the cart converge downwardly there is sufficient room on each side of the wheel 50 for at least one person to sleep.

Therefore, the cart of the present invention maximizes the volume and weight of supplies which can be transported as well as the degree of maneuverability, balance and ease of use when transporting such a work load over rough terrain and along narrow trails and can readily be disassembled for storage.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by letters Patent is:

1. A cart for the transport of a work load in areas of limited accessibility comprising a pair of return bent, downwardly convergent frame members each defining a bent portion and having a pair of divergent portions; cross bars interconnecting the divergent portions of each frame member in spaced substantially parallel relation; connecting rods mounted on and extending between the corresponding divergent portions of the frame members; a ground engaging wheel mounted for rotational movement on the bent portions of the frame members; panels interconnecting the divergent portions and bars, the divergent portions and rods, and the bars and rods adjacent to the wheel so as to form a receptacle for the receipt of the work load; and handle means mounted on the divergent portions to facilitate maneuvering of the cart.

2. The cart of claim 1 in which a brake mechanism is mounted on one of the frame members in operable association with the wheel and a control cable is extended along a divergent portion of the member with a lever mounted at the remote end thereof in association with the handle means, the lever being manipulatable to operate the brake mechanism to slow or terminate rotation of the wheel during movement.

3. The cart of claim 2 in which the rods, panels and wheel can be disconnected from the frame members to permit the cart to be disassembled for compact storage.

4. The cart of claim 3 in which the handle means includes a handle co-extensively extended from each divergent portion of the frame members remote from the bent portions to permit the cart to be guided by two persons over rough terrain.

5. The cart of claim 4 in which the receptacle as defined by the panels has the configuration of an inverted truncated pyramid permitting the center of gravity of the cart including a work load received therein to be easily maintained vertically above the wheel for ease of maneuverability and balance.

* * * * *